(No Model.) 2 Sheets—Sheet 2.
D. L. HOLDEN.
BEER COOLING APPARATUS.
No. 444,533. Patented Jan. 13, 1891.
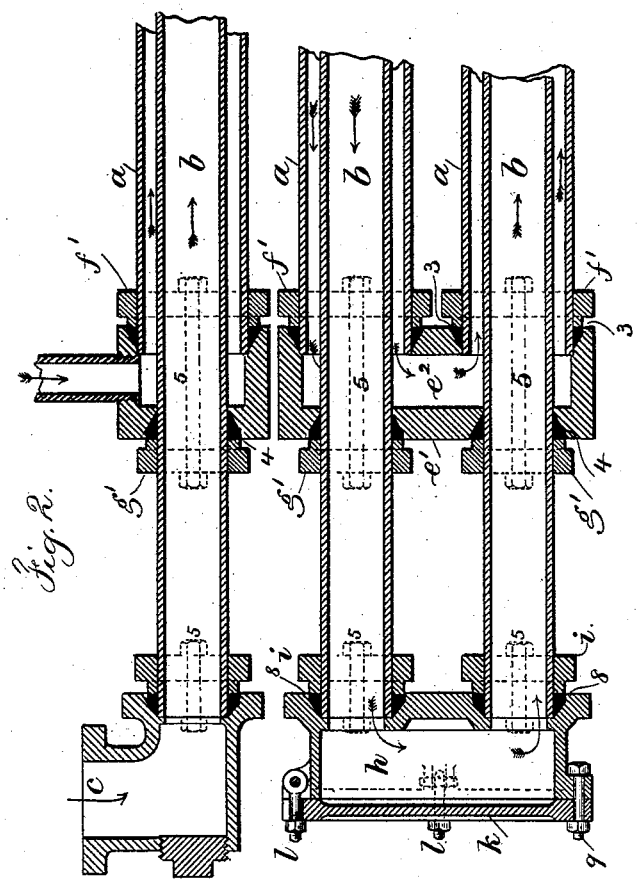
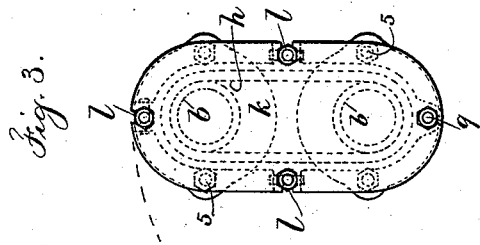
Witnesses
Chas H. Smith
J. Staib
Inventor
Daniel L. Holden
By Lemuel W. Serrell
atty

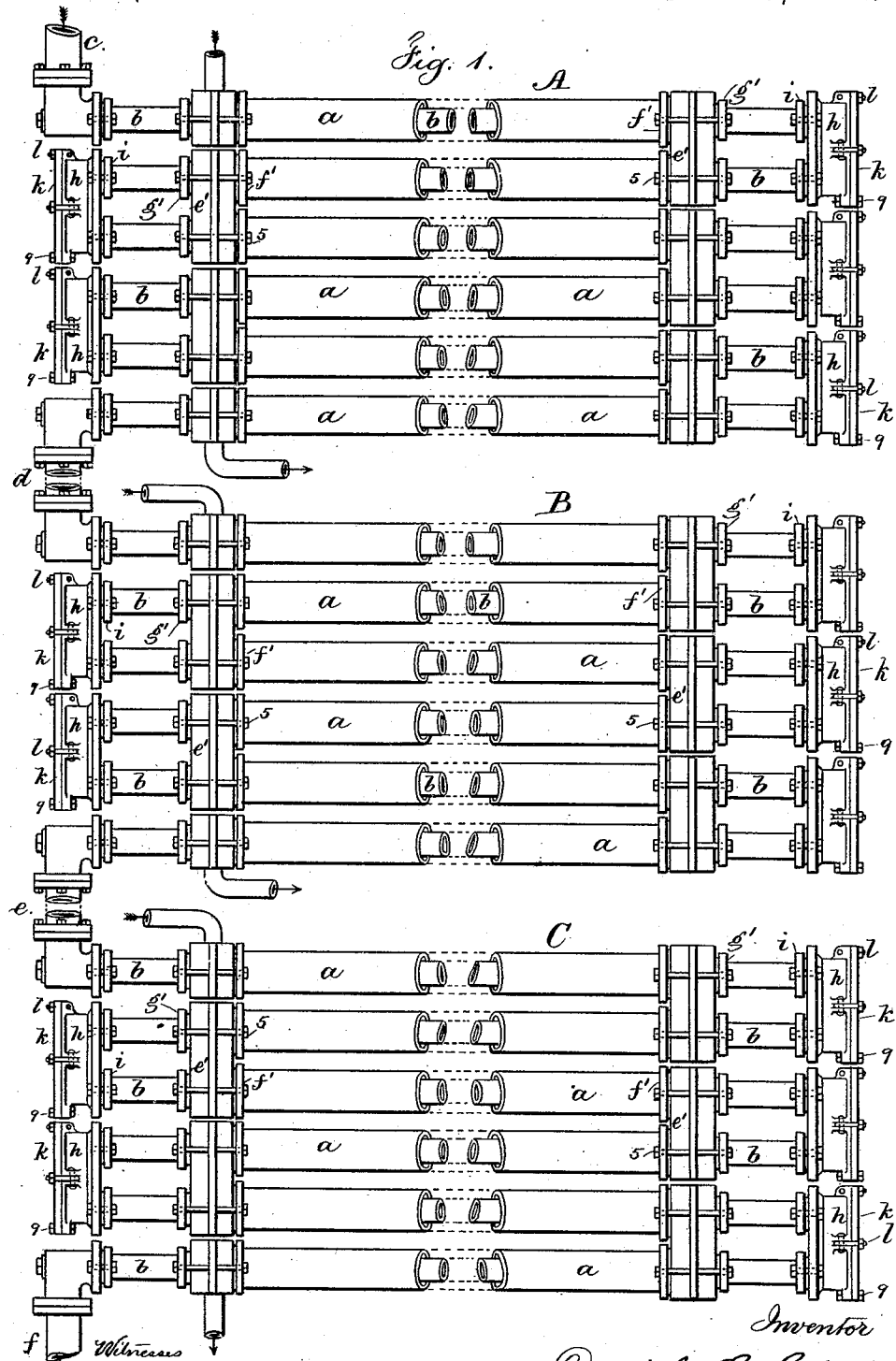

UNITED STATES PATENT OFFICE.

DANIEL L. HOLDEN, OF NEW YORK, ASSIGNOR TO THE NEW PROCESS ICE AND REFRIGERATING MACHINE COMPANY, OF BROOKLYN, NEW YORK.

BEER-COOLING APPARATUS.

SPECIFICATION forming part of Letters Patent No. 444,533, dated January 13, 1891.

Application filed December 30, 1889. Serial No. 335,396. (No model.)

*To all whom it may concern:*

Be it known that I, DANIEL L. HOLDEN, a citizen of the United States, and a resident of the city, county, and State of New York, have invented a new and useful Improvement in Apparatus for Cooling Beer; and the following is declared to be a description of the same.

In the process of manufacturing beer the operation of conveying the hot beer from the kettles or coppers through the hop-back to the vats of the receiving-vaults and cooling the same while in transit has heretofore been attended with much delay and loss of time, beside loss of bulk from evaporation, because the beer-liquor is exposed to the atmosphere, not only in cooling-pans, but as the same runs over and drips from the pipes and other parts of the well-known cooling apparatus. In thus manufacturing beer dust and animal or vegetable matter or spores floating in the air are liable to get into the beer and cause the same to spoil or otherwise become unsalable.

I employ a continuous apparatus wherein the beer as it passes hot from the kettles or hop-back is not at all exposed to the atmosphere while in transit through the cooling apparatus to the receiving-vault vats. Consequently there is no loss from evaporation, and it is not possible for dust or spores of any kind in the atmosphere to get into the beer, as the same passes directly from the kettles or hop-back through the cooling apparatus into the receiving-vault vats. It is necessary in carrying out this process to keep the pipes of the apparatus, and especially the horizontal pipes of the cooling apparatus, sweet and clean, and to this end they must be periodically swabbed out from end to end. In carrying out my invention, to enable these pipes to be cleaned I employ in connection with series of external water-pipes and boxes or castings and packings for the same and internal beer-pipes passing through said external pipes and the boxes, boxes or castings for receiving the ends of the beer-pipes in pairs, and said boxes have removable heads to provide access for cleaning with a swab, said boxes serving as return-bends for the passage of the beer from one of the pairs of pipes to the other.

In the drawings, Figure 1 represents by an elevation the apparatus employed for carrying out my invention; and Fig. 2 is a longitudinal section in larger size, showing part of my cooling apparatus, and Fig. 3 is an elevation of the removable heads of the boxes.

A B C represent series of cooling-pipes, each of which has external pipes $a$ for water or other cooling medium and internal pipes $b$ for the beer to be cooled. A pipe $c$ connects the upper internal pipe $b$ of the series A directly with the heating or boiling kettles or hop-back employed in the manufacture of beer. Pipes $d$ and $e$ connect the internal beer-pipes of the series A to series B, and B to C, and a pipe $f$ connects the lower internal beer-pipe $b$ of the series C directly with the vats in the vault, where the beer is stored after being cooled.

The hot beer from the kettles or hop-back passes directly by the pipe C, through the internal pipes $b$ of the series A, B, and C, and the pipes $d$ and $e$, and the pipe $f$, to the vats in the vault, and the beer does not come in contact with the atmosphere at all in its passage from the kettles to the vats.

The series of cooling-pipes A B C are supplied through their external pipes $a$ with cooling-liquid from any desired source. I prefer to use in the series A the spent water of ice-machines, in the series B water from hydrants, in the series C the refrigerating-liquor or expanding gas from an ice and refrigerating machine.

It is preferable to cause the beer to descend through the series of pipes and coolers; but this is not absolutely necessary. Any number of series of cooling-pipes may be employed.

In making up the series of cooling-pipes A, B, and C, I prefer to employ devices similar to those set forth in my application for patent on ice and refrigerating machines, filed October 14, 1889, Serial No. 326,946, which devices consist of boxes or castings $e\ e'$, having passage-ways $e^2$, and into which boxes the respective ends of the outer pipes $a$ are received and secured by collars $f'$ and packings 3. The internal pipes $b$ pass through said boxes $e\ e'$, and around said pipes are collars $g'$ and packings 4. These collars $f'\ g'$ are secured by bolts 5, so that tight joints are formed between the said boxes and pipes. There are similar boxes $h$, into which the respective ends of pairs of internal pipes $b$ are fitted, and I provide collars $i$ and packings 8 around the ends of said inner pipes to form tight joints between them and said boxes. These boxes $h$ are open at one end and provided with removable heads $k$, which are pivoted to the boxes by bolts at 9, and swinging eyebolts $l$ are provided and pivoted to the boxes and adapted to enter notches in the removable heads to clamp the same to place against the open ends of the boxes. These boxes $h$ form return-passages between the ends of the pairs of inner pipes $b$, and whenever it becomes necessary to clean out or swab the inside of the pipes $b$ and boxes $h$ the eyebolts $l$ are loosened and swung back, and the heads $k$ swing on their pivots 9, and access is thereby given for this cleansing operation.

I do not limit myself to the construction of the heads $k$, as simple plates of metal fitting upon the ends of the boxes $h$ and held in place by hook-ended bridge-bars and central screws may be employed with equal facility.

I claim as my invention—

1. The combination, with the pairs of external pipes $a$ for cooling liquid, the boxes $e'$, to which such pipes are connected and into which they open, and the pairs of internal pipes $b$ for liquid to be cooled, passing through the pipes $a$ and boxes $e$ and projecting beyond, of the boxes $h$, connected to the ends of the pairs of pipes $b$ and open at one end, and removable heads or covers to said boxes, by which access can be had to the interior of the internal pipes and boxes for purpose of cleaning, substantially as specified.

2. The combination, with the pairs of external pipes $a$ for cooling liquid, the boxes $e'$, to which such pipes are connected and into which they open, and the pairs of internal pipes $b$ for liquid to be cooled, passing through the pipes $a$ and boxes $e'$ and projecting beyond, of the boxes $h$, connected to the ends of the pairs of pipes $b$ and open at one end, the removable heads or covers $k$, pivoted by bolts 9 to the boxes, and the swinging eyebolts $l$, pivoted to the boxes and adapted to engage and secure the covers $k$, substantially in the manner and for the purposes set forth.

Signed by me this 16th day of December, A. D. 1889.

DANIEL L. HOLDEN.

Witnesses:
GEO. T. PINCKNEY,
HAROLD SERRELL.